Feb. 11, 1964   M. I. GLASS ETAL   3,120,718
TOY BARBECUE GRILL WITH SOUNDING MEANS
Filed Oct. 10, 1960
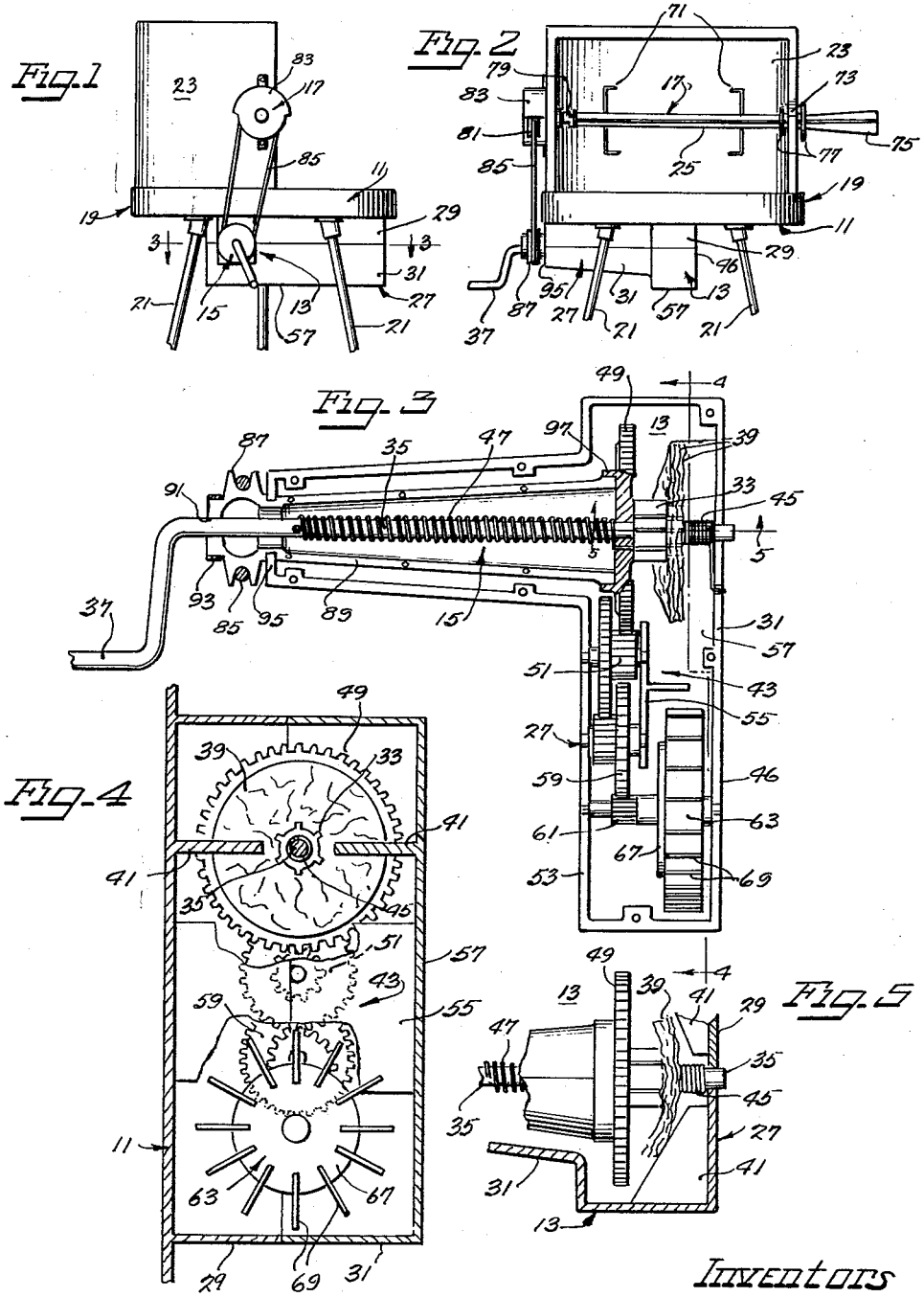
Inventors
MARVIN I GLASS
CARL AYALA
By Soans, Anderson, Luedeka & Fitch
Attys United States Patent Office 3,120,718
Patented Feb. 11, 1964

3,120,718
TOY BARBECUE GRILL WITH
SOUNDING MEANS
Marvin I. Glass, 57 E. Ohio St., Chicago, Ill., and Carl
Ayala, Chicago, Ill.; said Ayala assignor to said Glass
Filed Oct. 10, 1960, Ser. No. 61,690
9 Claims. (Cl. 46—14)

This invention relates generally to toys which resemble portable cooking utensils or appliances and which simulate activity associated with use of such utensils or appliances. More particularly, the present invention relates to and has for one of its objects the provision of a toy simulating, both in appearance and operation, a portable barbecue grill. A further object of the invention is the provision of a toy barbecue grill which includes a rotating spit feature.

Other objects of the invention include the provision of a toy of the type referred to above which is of sturdy and yet economical construction and which will provide many hours of entertaining activity for children. Additional objects of the invention will become apparent by reference to the following description and the accompanying drawings of one embodiment of the invention in which:

FIGURE 1 is a partial side elevational view of a toy embodying various of the features of the invention;

FIGURE 2 is a partial front elevational view of the toy shown in FIGURE 1;

FIGURE 3 is an enlarged, partially broken away and sectioned, view taken along line 3—3 of FIGURE 1;

FIGURE 4 is a fragmentary sectional view, partially broken away, taken along line 4—4 of FIGURE 3; and FIGURE 5 is a fragmentary sectional view taken along line 5—5 of FIGURE 3.

A toy in accordance with the invention basically includes, as shown in FIGURES 1 and 2, a bowl or other suitable member 11 which simulates a receptacle or pot for receiving charcoal or other burnable material, a means or mechanism 13 for producing a crackling sound which simulates the noise of cooking, and suitable means or mechanism 15 for operating or driving the sound producing mechanism. If desired, suitable means 17 can also be incorporated to provide a rotating spit.

The form of the invention shown in FIGURES 1 and 2 is that of a common type of outdoor barbecue grill. However, the features of the invention are not limited to the specific barbecue grill shown and can be incorporated in many other forms of cooking grills, such as barbecue wagons and Hibachi grills. The illustrated barbecue grill is principally fabricated of plastic and includes a frame 19 which comprises the bowl 11 and suitable support means which, in the disclosed construction, constitutes a tripod stand 21. Preferably, there is located within the bowl 11 to heighten the realism of the toy, but not shown in the drawings, a vacuum formed plastic representation of ignited charcoal. There is also preferably provided, but not shown in the drawings, a removable wire grill or the like, as is usually provided in most real barbecue grills. Attached to the bowl 11 by any suitable means and forming a part of the frame 19 is a hood 23 which supports a rotating spit 25.

The sound producing mechanism 13 and the drive mechanism 15 are both generally enclosed in a housing 27 which depends from the bottom of the bowl 11. As shown best in FIGURES 2, 3, and 4, the housing is generally of L shape and includes an upper half section 29 molded integrally with the bowl 11 and a lower half section 31 which, after assembly therein of various of the operating components, can be attached to the upper half section by suitable means.

The sound making mechanism 13 generally incorporates the features of the sound making mechanism disclosed in our earlier co-pending application entitled "Toy," Serial No. 54,497, filed September 7, 1960, which application is assigned as is this application. This application is a continuation-in-part of said copendng application, Serial No. 54,497, filed September 7, 1960. However, in the disclosed construction, the sound making mechanism 13 and the drive mechanism 15 are arranged so as to employ certain common parts. In this regard, the sound mechanism includes a hub 33 which is rotatably mounted on a shaft 35 supported for rotation in the housing 27. As will be seen, one end of the shaft is formed with an offset arm portion 37 to provide a crank which is operable to store energy in the drive mechanism 15 and which resembles the crank incorporated in a real barbecue grill for raising and lowering the wire grill usually provided in the bowl.

Carried by the hub 33 for rotation therewith are one or more slightly spaced sheets 39 of material which produce a crackling sound incident to displacement of one segment of the shee material relative to an adjacent segment. Examples of such materials are shim stock and foil material. Molded into each of the half case sections 29 and 31 is a rib or lug 41, which ribs project in opposed relation to each other and operate to displace the sheet material from its normal planar condition. Thus, when the hub 33 is rotated, successive segments of the sheet material are caused to be displaced by engagement with the ribs 41, after which they return to their normal condition, thereby causing crackling sounds.

The hub 33 can be rotated by various means to cause the production of the crackling sound effect. For instance, the before-mentioned shaft 35 can be directly connected to the hub 33 so that a crackling noise is provided as a result of shaft rotation by the crank portion 37. However, in the disclosed construction, there is provided in the drive mechanism an energy storing means and means for controlling the release or dissipation of energy from the energy storing means. In the disclosed construction, this controlling or restraining means includes a gear train 43 which limits the rate of dissipation of energy so that relatively sustained operation is obtained after initially storing energy in the device.

More specifically, the shaft 35 is elongated and has, in surrounding relation at one end thereof, a one-way clutch or brake 45 which takes the form of a closely wound helical spring having one leg anchored in the side wall 46 of the housing to prevent counterclockwise rotation of the shaft, as seen in FIGURE 1. Located in surrounding relation to the major part of the shaft 35 is a torsion spring 47 which is arranged to permit the storage of energy therein. In this regard, the torsion spring 47 has one end anchored in the shaft 35 and has its other end fixed in a main gear 49 which is rotatably mounted on the shaft 35. The main gear 49 serves as a portion of the gear train 43 previously referred to, and is integrally molded with the hub 33 so that rotation of the main gear results in the production of the crackling sound effect.

In addition to the main gear 49, the gear train 43 also includes a first gear and pinion assembly 51 which meshes with the main gear 49 and which is journalled in one side wall 53 of the housing 27 and in an upright rib 55 projecting from the bottom wall 57 of the housing. In turn, the first gear and pinion assembly 51 is engaged with a second gear and pinion assembly 59 which is also journalled between the side wall 53 and the rib 55. Finally, the second gear and pinion assembly 59 is engaged with a pinion portion 61 of a paddle wheel structure 63 which is journalled between the side walls 46 and 53 of the housing 27, and which includes a disc 67 having thereon a series of radially outwardly extending blades or paddles 69. The rotation of the gear train 43, together with the travel of the blades through the atmosphere results in sufficient resistance so that rotation of the main gear 49 is slowed, thereby permitting storage of energy in the spring 47 by rotating the shaft 35 at a faster rate than the gear 49 is allowed to rotate, and thereby also controlling the rate at which the energy stored in the torsion spring 47 is dissipated so as to drive the sound producing means 13 after rotation of the shaft 35 is discontinued.

As mentioned before, the disclosed construction also makes provision for the spit 25 which is rotatably carried by the hood 23. More particularly, the spit constitutes an elongated shaft having a pair of spaced forks 71. At one end, the spit is supported for rotation in a notch or cut-out 73 in the hood, and exterior of the hood, includes a handle 75. Adjacent the area on the spit which is supported by the hood, there is provided a pair of spaced collars or flanges 77 which straddle the wall of the hood 23 to prevent axial displacement of the spit 25 relative to the hood. At its other end, the spit includes suitable means for driving connection with the extending shaft 79 of a pulley 81.

In this regard, the pulley 81 is mounted within a partial enclosure 83 on the outside of the hood 23, the pulley 81 being formed integrally with the shaft 79, which shaft is journalled in the hood 23 and extends inwardly of the hood for interconnection with the spit 25. Any suitable means can be provided for interconnecting the shaft 79 with the spit 25 and for preventing rotation of the spit 25 relative to the shaft 79. In the disclosed construction, the end of the shaft 79 is of square cross section and fits into a mating socket in the adjacent end of the spit 25.

The pulley 81 is driven by a belt 85 which is also trained about a sheave 87 formed at the end of a sleeve 89 located in surrounding relation to the shaft 35 generally within the housing 27. The sleeve 89 takes the form generally of a truncated cone which is formed in two mating longitudinal half sections. At their outer or smaller ends the half sections are secured together by a ring 93 and together provide the sheave 87 and a bearing 91 for supporting the shaft 35 inwardly of the crank portion 37. As the sleeve 89 is also rotatable, as will be immediately explained, the outer end of the sleeve 89 is journalled for rotation inwardly of the sheave 87 in the end wall 95 of the housing 27. At its other or inner end, the sleeve half sections are retained in assembled condition and are rotatable as a unit with the gear 49 as a result of frictional engagement within a collar 97 formed on the main gear 49 on the opposite side from the hub 33. Thus, when the main gear rotates, it drives the hub 33 and attached sheet material to produce a crackling sound effect, and also rotates the sleeve 89 so as to cause rotation of the spit 25.

In the operation of the toy, when the shaft 35 is rotated in the clockwise direction, as seen in FIGURE 1, by the crank portion 37, the outer end of the torsion spring 47 is also rotated in this direction as it is anchored to the shaft. This rotation of the torsion spring 47 tends to rotate the main gear 49 in the same direction at the same speed. As explained, rotation of the main gear 49 results in the production of a crackling sound and in rotation of the spit 25.

During rotation of the shaft 35, the gear train 43 and the air resistance developed by the paddle wheel structure 63 prevent rapid rotation of the main gear 49, thereby permitting storage of energy in the torsion spring 47 when the shaft 35 is rotated at a rate faster than the rotation of the main gear 49. Subsequently, after discontinuance of the rotation of the shaft by means of the crank portion 37, the torsion spring 47 continues to rotate the main gear 49 until all of the energy is dissipated, which dissipation is controlled by the gear train 43 and paddle wheel structure 63 to provide a relatively sustained operation.

Various of the features of the invention are set forth in the following claims.

What is claimed is:

1. A toy barbecue grill comprising a simulated barbecue grill frame including a simulated charcoal container bowl and means for supporting said bowl on a supporting surface, means on said frame for producing a crackling sound simulating the cooking of food, and means for operating said sound producing means including a crank extending exteriorly of said bowl.

2. A toy barbecue grill comprising a simulated barbecue grill frame including a simulated charcoal container bowl, means for supporting said bowl on a supporting surface and a simulated barbecue grill hood partially covering said bowl, means on said frame for producing a crackling sound simulating the cooking of food, means rotatably carried by said hood simulating a spit, and means for operating said sound producing means and concurrently rotating said spit and including a crank extending exteriorly of said bowl.

3. A toy barbecue grill comprising a simulated barbecue grill frame including a simulated charcoal container bowl and means for supporting said bowl on a supporting surface, means on said frame for producing a crackling sound simulating the cooking of food, and means for powering said sound producing means including mechanical means for storing energy.

4. A toy barbecue grill comprising a simulated barbecue grill frame including a simulated charcoal container bowl, means for supporting said bowl on a supporting surface, and a simulated barbecue grill hood partially covering said bowl, means on said frame for providing a crackling sound simulating the cooking of food, means rotatably carried by said hood simulating a spit, and means for powering said sound producing means and rotating said spit and including energy storing means, and means for controlling the rate of energy transferred from said energy storage means so as to power said sound producing means and to rotate said spit.

5. A toy barbecue grill comprising a simulated barbecue grill frame including a simulated charcoal container bowl and means for supporting said bowl on a supporting surface, means on said frame for providing a crackling sound simulating the cooking of food, means rotatably carried by said frame simulating a spit, and means for powering said sound producing means and rotating said spit.

6. A toy resembling a barbecue grill, said toy comprising a frame including a bowl simulating a container for charcoal and means for supporting said bowl on a supporting surface, a shaft rotatably supported on said frame, a crank arm at one end of said shaft for rotating said shaft, a gear carried on said shaft for rotation thereon, a torsion spring extending axially of said shaft in surrounding relation thereto, said spring having one end fixed to said shaft and having its other end fixed to said gear, means for controlling the rotation of said gear so that energy can be stored in said spring by cranking said shaft faster than the rotation of said gear, and means for producing a crackling sound, said sound producing means being mounted in part on said frame and in part on said gear so as to be operable incident to rotation of said gear, whereby said crank can be rotated to cause rotation of said gear so as to produce said crackling sound and so as to store energy in said spring for subsequent rotation of said gear and the consequent production of a crackling sound after discontinuance of the rotation of said crank.

7. A toy resembling a barbecue grill, said toy comprising a frame including a bowl simulating a container for charcoal, means for supporting said bowl on a supporting surface, and a hood partially covering said bowl, means rotatably carried by said hood in simulation of a spit, a shaft rotatably supported on said frame, a crank arm at one end of said shaft for rotating said shaft, a gear carried on said shaft for rotation thereon, means connecting said spit means and said gear to cause rotation of said spit means incident to rotation of said gear, a torsion spring extending axially of said shaft in surrounding relation thereto, said spring having one end fixed to said shaft and having its other end fixed to said gear, means for controlling the rotation of said gear so that energy can be stored in said spring by cranking said shaft faster than the rotation of said gear, and means for producing a crackling sound, said sound producing means being mounted in part on said frame and in part on said gear so as to be operable incident to rotation of said gear, whereby said crank can be rotated to cause rotation of said gear so as to produce said crackling sound, to rotate said spit means, and to store energy in said spring for subsequent rotation of said gear and the consequent production of a crackling sound together with the rotation of said spit means after discontinuance of the rotation of said crank.

8. A toy resembling a barbecue grill, said toy comprising a frame including a bowl simulating a container for charcoal and means for supporting said bowl on a supporting surface, and a hood partially covering said bowl, means rotatably carried by said hood in simulation of a spit, a shaft rotatably supported on said frame, a crank arm at one end of said shaft for rotating said shaft, a gear carried on said shaft for rotation thereon, means connecting said spit means and said gear to cause rotation of said spit means incident to rotation of said gear, a torsion spring extending axially of said shaft in surrounding relation thereto, said spring having one end fixed to said shaft and having its other end fixed to said gear, a gear train supported by said frame in meshing engagement with said gear for controlling the rotation of said gear, said gear train including a paddle wheel which assists in controlling the rotation of said gear by virtue of the resistance of the atmosphere to rotation of said paddle wheel, whereby energy can be stored in said spring by cranking said shaft faster than the rotation of said gear, and means for producing a crackling sound, said sound producing means being mounted in part on said frame and in part on said gear so as to be operable incident to rotation of said gear, whereby said crank can be rotated to cause rotation of said gear so as to produce said crackling sound, to rotate said spit means, and to store energy in said spring for subsequent rotation of said gear and the consequent production of a crackling sound together with rotation of said spit means after discontinuance of the rotation of said crank.

9. A toy barbecue grill comprising a simulated barbecue grill frame including a simulated charcoal container bowl and means for supporting said bowl on a supporting surface, means on said frame for producing a crackling sound simulating the cooking of food, and means on said frame for operating said sound producing means.

References Cited in the file of this patent

UNITED STATES PATENTS

| | | |
|---|---|---|
| 1,307,550 | Huss | June 24, 1919 |
| 2,314,092 | Kelly | Mar. 16, 1943 |
| 2,783,705 | Vrionis | Mar. 5, 1957 |

OTHER REFERENCES

German printed application 1,022,948, Jan. 16, 1958.